United States Patent
Yang et al.

(10) Patent No.: US 9,154,934 B2
(45) Date of Patent: Oct. 6, 2015

(54) SYSTEM AND METHOD FOR PRE-ASSOCIATION DISCOVERY

(71) Applicant: FutureWei Technologies, Inc., Plano, TX (US)

(72) Inventors: Yunsong Yang, San Diego, CA (US); Younghoon Kwon, San Diego, CA (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 104 days.

(21) Appl. No.: 14/105,895

(22) Filed: Dec. 13, 2013

(65) Prior Publication Data
US 2014/0293978 A1 Oct. 2, 2014

Related U.S. Application Data

(60) Provisional application No. 61/806,177, filed on Mar. 28, 2013.

(51) Int. Cl.
*H04L 29/08* (2006.01)
*H04W 8/00* (2009.01)

(52) U.S. Cl.
CPC .......... *H04W 8/005* (2013.01); *H04L 29/08423* (2013.01); *H04L 29/08648* (2013.01); *H04L 67/1061* (2013.01); *H04L 67/16* (2013.01)

(58) Field of Classification Search
None
See application file for complete search history.

(56) References Cited

U.S. PATENT DOCUMENTS

| | | | |
|---|---|---|---|
| 6,535,867 B1 * | 3/2003 | Waters | 1/1 |
| 6,785,714 B1 * | 8/2004 | Thompson et al. | 709/213 |
| 8,141,149 B1 * | 3/2012 | Henry et al. | 726/22 |
| 2013/0203413 A1 * | 8/2013 | Lambert | 455/435.1 |
| 2013/0315100 A1 * | 11/2013 | Li et al. | 370/254 |
| 2014/0198724 A1 * | 7/2014 | Abraham et al. | 370/328 |
| 2014/0211659 A1 * | 7/2014 | Abraham et al. | 370/254 |
| 2014/0293978 A1 * | 10/2014 | Yang et al. | 370/338 |
| 2014/0349578 A1 * | 11/2014 | Huang et al. | 455/41.2 |
| 2014/0351476 A1 * | 11/2014 | Huang et al. | 710/303 |
| 2014/0351478 A1 * | 11/2014 | Lee et al. | 710/303 |

OTHER PUBLICATIONS

Wi-Fi Alliance, "Wi-Fi Peer-to-Peer (P2P) Technical Specification," version 1.2, Wi-Fi Alliance Technical Committee, P2P Task Group, Dec. 14, 2011, 161 pages.
Wi-Fi Alliance, "Wi-Fi Direct Services Draft Technical Specification," version 0.1, Wi-Fi Alliance Technical Committee, Wi-Fi Direct Services Task Group, Apr. 2, 2013, pp. 1-86.

\* cited by examiner

*Primary Examiner* — Christopher Crutchfield
(74) *Attorney, Agent, or Firm* — Slater & Matsil, L.L.P.

(57) ABSTRACT

A method for operating a seeker device includes generating a first seeker truncated hash output from a sought service name, and generating a second seeker truncated hash output from the sought service name, wherein the first seeker truncated hash output and the second seeker truncated hash output are uncorrelated. The method also includes transmitting a first request message including the first seeker truncated hash output, and receiving a first response message from an advertiser device, the first response message including a second advertiser truncated hash output generated from an advertised service name, wherein the first seeker truncated hash output matches a first advertiser truncated hash output generated from the advertised service name.

31 Claims, 14 Drawing Sheets

SYSTEM AND METHOD FOR PRE-ASSOCIATION DISCOVERY

This application claims the benefit of U.S. Provisional Application No. 61/806,177, filed on Mar. 28, 2013, entitled "Systems and Methods for Pre-Association Discovery," which application is hereby incorporated herein by reference.

TECHNICAL FIELD

The present disclosure relates generally to digital communications, and more particularly to a system and method for pre-association discovery.

BACKGROUND

The IEEE 802.11 family of technical standards and attendant technology, also commonly referred to as Wi-Fi, is evolving towards a service-centric model of connectivity where devices connect for a specific purpose. The purposeful connections are triggered by applications looking for peer devices that support specific services. Examples of these services include file sharing, printing, media streaming, sensor information, and the like.

SUMMARY OF THE DISCLOSURE

Example embodiments of the present disclosure which provide a system and method for pre-association discovery.

In accordance with an example embodiment of the present disclosure, a method for operating a seeker device is provided. The method includes generating, by the seeker device, a first seeker truncated hash output from a sought service name, and generating, by the seeker device, a second seeker truncated hash output from the sought service name, wherein the first seeker truncated hash output and the second seeker truncated hash output are uncorrelated. The method also includes transmitting, by the seeker device, a first request message including the first seeker truncated hash output, receiving, by the seeker device, a first response message from an advertiser device, the first response message including a second advertiser truncated hash output generated from an advertised service name, wherein the first seeker truncated hash output matches a first advertiser truncated hash output generated from the advertised service name, and determining, by the seeker device, that the advertised service name matches the sought service name in response to determining that the second advertiser truncated hash output matches the second seeker truncated hash output.

In accordance with another example embodiment of the present disclosure, a method for operating an advertiser device is provided. The method includes generating, by the advertiser device, a first advertiser truncated hash output from an advertised service name, and generating, by the advertiser device, a second advertiser truncated hash output from the advertised service name, wherein the first advertiser truncated hash output and the second advertiser truncated hash output are uncorrelated. The method also includes receiving, by the advertiser device, a first request message from a seeker device, the first request message including a first seeker truncated hash output generated from a sought service name, and transmitting, by the advertiser device, a first response message including the second advertiser truncated hash output in response to determining that the first seeker truncated hash output matches the first advertiser truncated hash output.

In accordance with another example embodiment of the present disclosure, a seeker device is provided. The seeker device includes a processor, a transmitter operatively coupled to the processor, and a receiver operatively coupled to the processor. The processor generates a first seeker truncated hash output from a sought service name, generates a second seeker truncated hash output from the sought service name, wherein the first seeker truncated hash output and the second seeker truncated hash output are uncorrelated, and determines that an advertised service name from an advertiser device matches the sought service name in response to determining that a second advertiser truncated hash output received from the advertiser device matches the second seeker truncated hash output. The transmitter transmits a first request message including the first seeker truncated hash output. The receiver receives a first response message from the advertiser device, the first response message including the second advertiser truncated hash output generated from the advertised service name, wherein the first seeker truncated hash output matches a first advertiser truncated hash output generated from the advertised service name.

In accordance with another example embodiment of the present disclosure, an advertiser device is provided. The advertiser device includes a processor, a receiver operatively coupled to the processor, and a transmitter operatively coupled to the processor. The processor generates a first advertiser truncated hash output from an advertised service name, and generates a second advertiser truncated hash output from the advertised service name, wherein the first advertiser truncated hash output and the second advertiser truncated hash output are uncorrelated. The receiver receives a first request message from a seeker device, the first request message including a first seeker truncated hash output. The transmitter transmits a first response message including the second advertiser truncated hash output in response to determining that the first seeker truncated hash output matches the first advertiser truncated hash output.

One advantage of an embodiment is that signaling overhead is reduced by transmitting truncated hash function outputs of the full service names rather than the full service names, which are typically shorter than the full service names.

A further advantage of an embodiment is that privacy is maintained and false match probability is reduced by transmitting different and yet uncorrelated hash function outputs of service names or truncations thereof.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to pre-association discovery. For example, a seeker device generates a first seeker truncated hash output from a sought service name, and generates a second seeker truncated hash output from the sought service name. The seeker device also transmits a first request message including the first seeker truncated hash output, and receives a first response message from an advertiser device, the first response message including a second advertiser truncated hash output generated from an advertised service name, wherein the first seeker truncated hash output matches a first advertiser truncated hash output generated from the advertised service name.

The present disclosure will be described with respect to example embodiments in a specific context, namely communications systems that support service centric connections and pre-association to discover services prior to the establishment of a connection. The disclosure may be applied to standards compliant communications systems, such as those that are compliant with IEEE 802.11, IEEE 802.15, Wi-Fi Alliance, Third Generation Partnership Project (3GPP), and the like, technical standards, and non-standards compliant communications systems, that support service centric connections and pre-association discovery.

Figure 1:
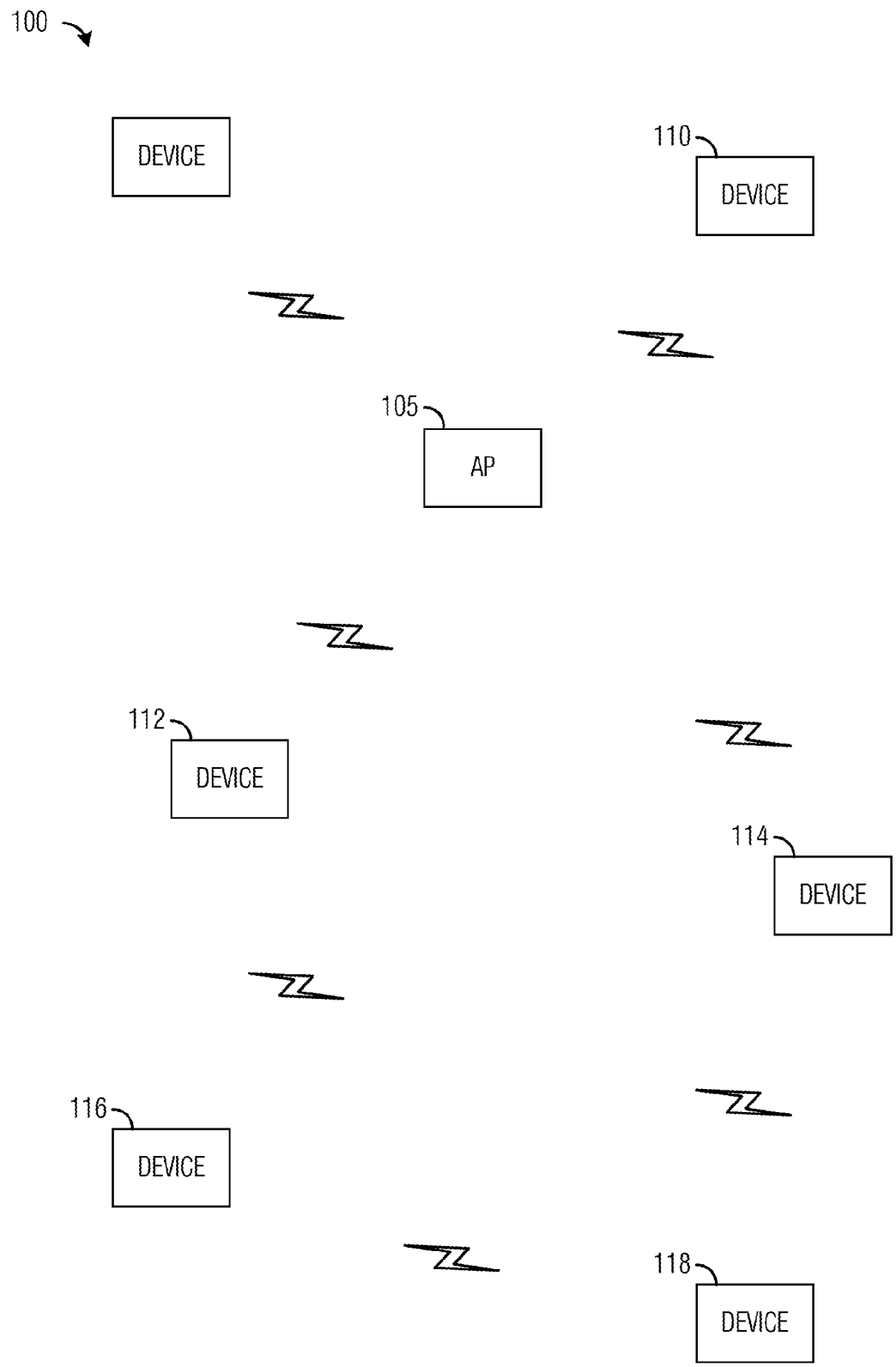
FIG. 1 illustrates a first example communications system according to example embodiments described herein.

FIG. 1 illustrates a first example communications system 100. Communications system 100 includes an access point (AP) 105 that is serving a plurality of devices, such as device 110, device 112, device 114, device 116, and device 118. An AP may also be commonly referred to as a base station, a communications controller, a controller, a NodeB, an evolved NodeB (eNB), and the like. A device may also be commonly referred to as a station, a user equipment (UE), a mobile station, a mobile, a user, a subscriber, a terminal, and the like. In a first communications mode, the devices may communicate through AP 105 by transmitting a frame to AP 105, which forwards the frame to its intended recipient. In a second communications mode, a first device may transmit a frame directly to a second device without having to go through AP 105.

While it is understood that communications systems may employ multiple APs capable of communicating with a number of stations, only a single AP, and a number of devices are illustrated in FIG. 1 for simplicity.

Conventionally, a connection between devices, such as Wi-Fi devices, needs to be established, which is accomplished by a successful completion of authentication, association, and in some cases, the IP address assignment, before service data may be exchanged between the devices. However, the amount of signaling overhead and delay incurred by the authentication, association, and IP address assignment procedures may become undesirable if the requested services can't be met by the connected device, since the signaling overhead and delay are wasted and other service providers are sought out. Thus, the notion of pre-association discovery has been introduced, wherein the procedure for discovering devices and the services that the devices provide, or at least a part of this procedure, is conducted before a connection is made, i.e., before the authentication and association procedure. In this way, the connection is established between the devices only when the requested services can be met.

Primary mechanisms for device discovery in Wi-Fi are passive scanning and active scanning. In passive scanning, a first Wi-Fi device listens to a Beacon frame that is transmitted by a second Wi-Fi device. Based on the received Beacon frame, the first Wi-Fi device discovers the second Wi-Fi device. Since a Beacon frame is usually broadcasted once a while (normally on the order of 100 milliseconds), the first Wi-Fi device suffers long delay and high power consumption in discovering the second Wi-Fi device using the passive scanning. In active scanning, a requesting Wi-Fi device (or a seeker Wi-Fi device) transmits a request frame, such as a Probe Request frame, which may include the information of a requested Wi-Fi device or a requested service. A Wi-Fi device that matches with the information of the requested Wi-Fi device or the requested service (also commonly referred to as a responding Wi-Fi device) responds back by sending a response frame, such as a Probe Response frame, which may include more information of the responding Wi-Fi device or the requested service such that the requesting (or seeker) Wi-Fi device may decide to make a connection with the responding Wi-Fi device or not. Hence, active scanning allows faster discovery, comparing to passive scanning, but uses additional air time for signaling overhead. Active scanning may not scale well in crowded environments. As an example, if Wi-Fi applications on devices were all using active scanning in a crowded venue to continuously discover peers, there would be an excessive amount of traffic just carrying the Probe Request and Probe Response frames alone.

Figure 2:
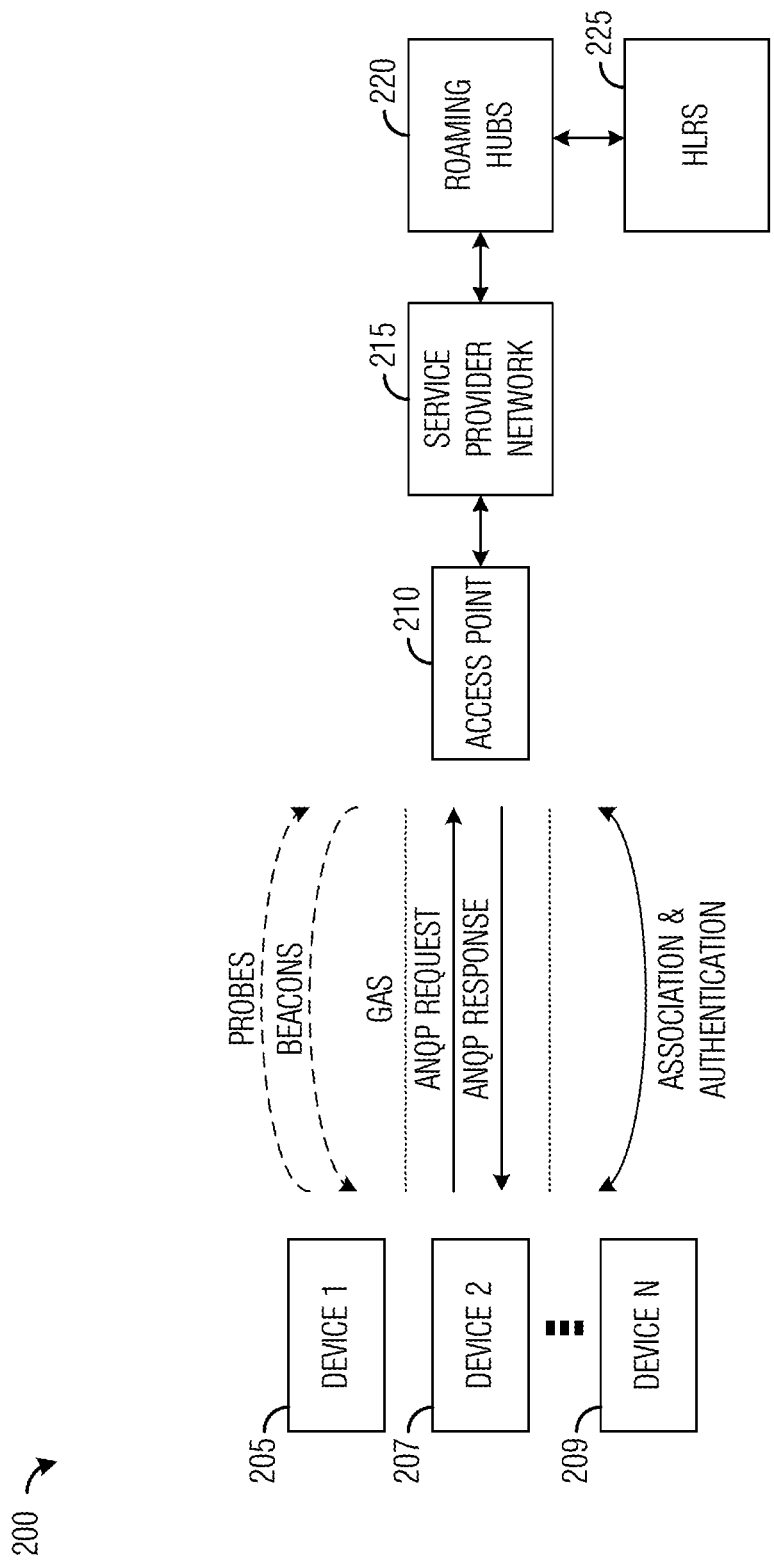
FIG. 2 illustrates a second example communications system according to example embodiments described herein.

In addition to device discovery, IEEE 802.11u provides network discovery mechanisms based on the transmission of a group of Public Action frames, which are known as the Generic Advertisement Service (GAS) Request and GAS Response frames and are used to carry the query data and response data for advertisement protocols such as Access Network Query Protocol (ANQP). FIG. 2 illustrates the GAS and ANQP operation. First, a user of a device initiates the intention to connect to Wi-Fi, and the user's device scans for available access points, which are also referred to as the Wi-Fi hotspots. In IEEE 802.11u, GAS frames are used to provide for Layer 2 transport of query data and response data of an advertisement protocol between the client on the user's device and a server in the network prior to authentication and association. In IEEE 802.11u, ANQP is a particular advertisement protocol used to discover different features and available services of the access network. After receiving the ANQP response data, the user's device selects a particular AP, and then proceeds with the authentication and association procedures which results in the establishment of a connection with the AP.

FIG. 2 illustrates a second example communications system 200. Communications system 200 may be an example of a Wi-Fi compliant communications system. Communications system 200 may utilize communications services and protocols, such as GAS and ANQP, to support operations including scanning and network selection. In general, GAS frames may be used to provide Layer 2 transport of query data and response data of an advertisement protocol, such as ANQP, between a terminal and a server in a communications system, such as communications system 200, prior to or post authentication (of the terminal, for example). Typically, ANQP may be used to discover different features and/or services of the communications system. A device compares the information regarding different networks or access points to select the best suitable to associate with. The device may proceed with an authentication process.

Usually, a station may be used to refer to any of the devices (such as devices 205, 207, and 209) shown in FIG. 2, which may include a cell phone, a laptop computer, a tablet, a smart sensor, a handheld or consumer electronic device, as well as other devices that have an interface (such as a Wi-Fi interface) that can interact with communications system 200. Some or all of the stations may also be able to interact with other types of communications systems, such as cellular networks, Bluetooth, proprietary networks, and the like.

An AP 210 and one or more stations may form a basic service set (BSS), which is the basic building block of a Wi-Fi communications system. A BSS may be identified by a service set identifier (SSID), which is a configured identifier and may be broadcasted by an AP of the BSS, such as AP 210. AP 210 may communicate with an AP controller or/and an ANQP server, which can be co-located or not with AP 210. AP 210 may be connected to a service provider network 215, which is connected to one or more roaming hubs 220. Roaming hubs 220 may be connected to home location register (HLRs) 225. Roaming hubs 220 and HLRs 225 provide support for device mobility, i.e., roaming.

In the Wi-Fi Direct specification, the Wi-Fi Alliance (WFA) further extended the usage of IEEE 802.11u GAS frame format to create two WFA-specific frames, namely the Service Discovery Request and Service Discovery Response frames. In Wi-Fi Direct, the Probe Request/Response frames are mandatorily used for peer-to-peer (P2P) device discovery. Then the Service Discovery Request/Response frames are optionally used to allow service discovery between peer devices in a pre-association state.

As discussed previously, in pre-association discovery, a requester device (or seeker device) may be able to discover services provided by an advertiser device or determine if the advertiser devices provides a requested service prior to completing a potentially delay filled authentication and association procedure.

Figure 3:
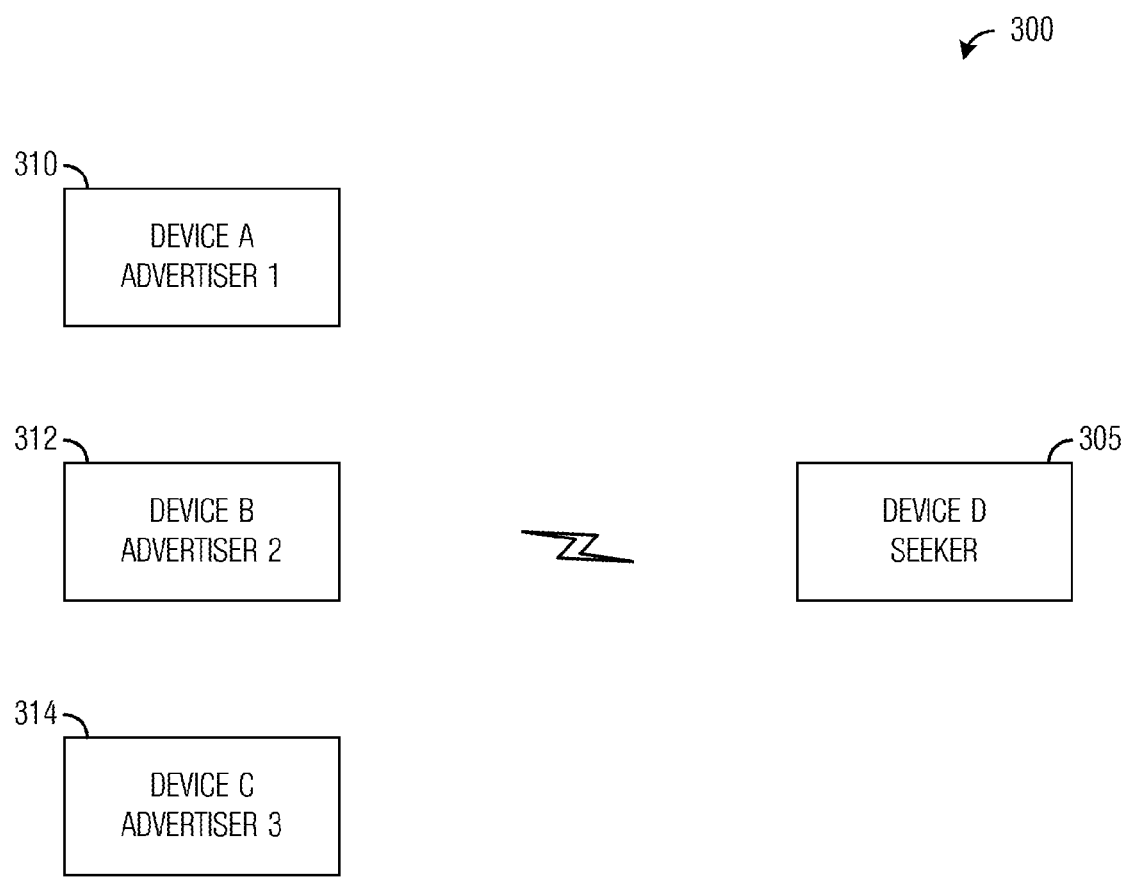
FIG. 3 illustrates a portion of an example communications system highlighting pre-association discovery according to example embodiments described herein.

FIG. 3 illustrates a portion of an example communications system 300 highlighting pre-association discovery. Communications system 300 includes a seeker device (device D) 305 and a plurality of advertiser devices, such as device A 310, device B 312, and device C 314. Seeker device 305 may perform pre-association discovery with some or all of the plurality of advertiser devices until it finds the service that it is looking for or it finds that the service is unavailable. As an example, seeker device 305 may perform pre-association discovery with device A 310. If device A 310 does not offer the service, seeker device 305 may perform pre-association discovery with device B 312. If device B 312 does not offer the service, seeker device 305 may perform pre-association discovery with device C 314. Alternatively, seeker device 305 may send a query about a service in a broadcast manner. Then, those devices, among device A 310, device B 312, and device C 314, who offer the service, may respond to device 305 individually.

In the on-going Wi-Fi Direct Services (WFDS) specification project in the WFA, proposals have been received to enhance the service discovery. First, each service is represented by a UTF-8 service name string. For example, the service name defined in the WFDS draft specification for printer service is "org.wi-fi.wfds.print.tx". The Wi-Fi Alliance further recommends that "Reverse domain name notation" is used for service names of services not defined by the Wi-Fi Alliance. Such a naming convention helps to ensure unique service names among services provided by different software developers.

In the WFDS draft specification that is currently being developed in the WFA, the Probe Request/Response frames are used to discover the service name, in addition to discovering the P2P device. Then the Service Discovery Request/Response frames are used to discover the service status (i.e. availability) and the service information attribute, which is application-defined data or strings, typically written in Extensible Markup Language (XML) format, describing the service and service parameters.

Figure 4:
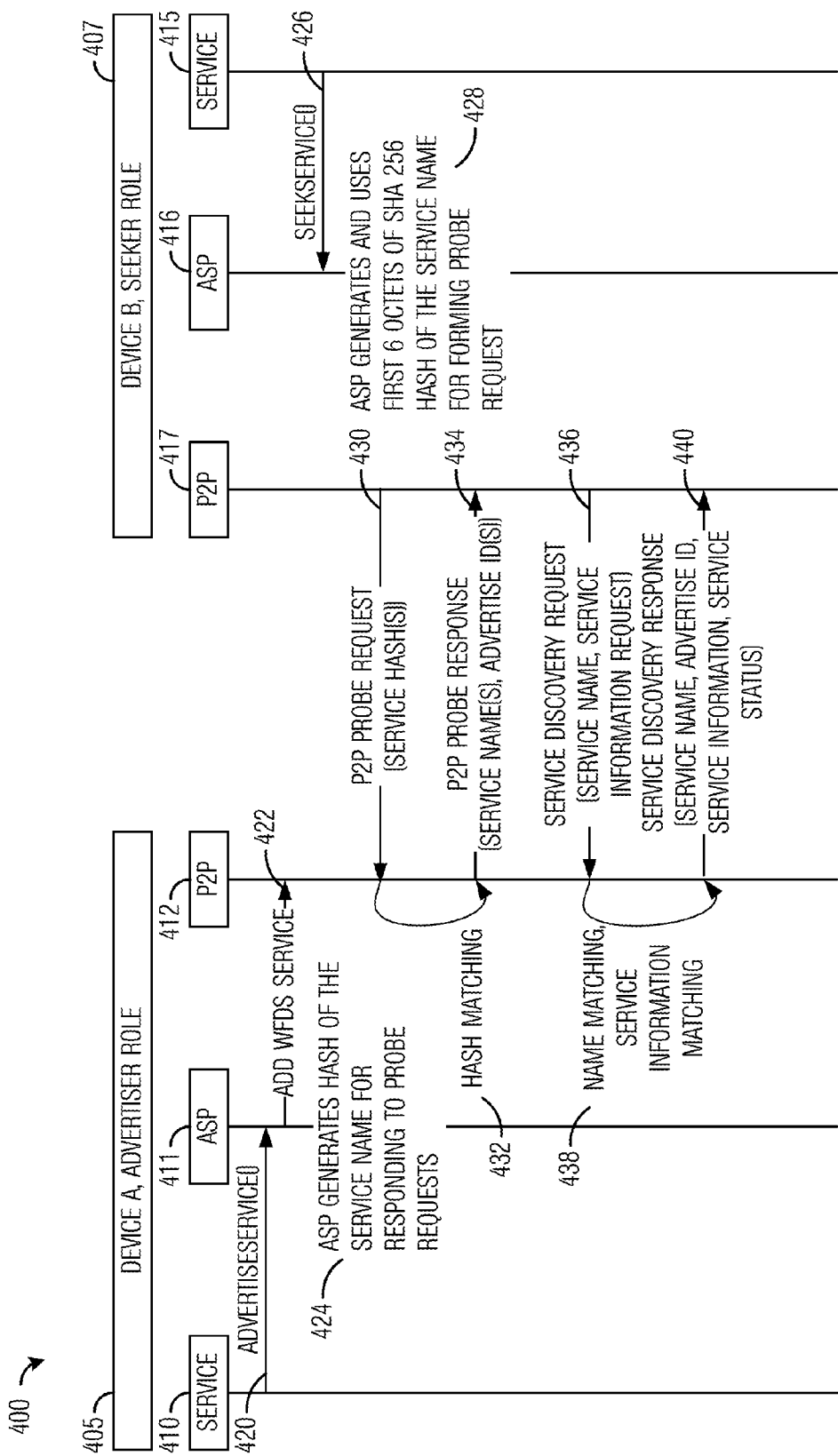
FIG. 4 illustrates an example message exchange diagram highlighting a pre-association discovery procedure.

FIG. 4 illustrates an example message exchange diagram 400 highlighting a pre-association discovery procedure, according to a draft WFDS specification. Message exchange diagram 400 illustrates messages exchanged between a device A 405 operating in an advertiser role and a device B 407 operating in a seeker role. Device A 405 includes multiple layers, such as service layer 410, application service platform (ASP) layer 411, and peer-to-peer (P2P) media access control (MAC) layer 412. Similarly, Device B includes service layer 415, ASP layer 416, and P2P MAC layer 417. The details of the layers below the P2P MAC layers, such as the physical (PHY) layers, are intentionally omitted.

Service layer 410 of device A 405 may initiate an advertisementservice( ) procedure with ASP layer 411 (shown as event 420) with a service_name_advertiser of a service provided by device A 405, which results in ASP layer 411 adding a WFDS service (shown as event 422). ASP layer 411 may also generate a hash of the service_name_advertiser (shown as event 424). The hash may be generated using a hashing function, such as SHA-256, for example. As an example, for a service_name_advertiser of "org.wifi.example", the Service Hash, which is the first 6 octets of the output of the hashing function, (in hexadecimal) is 4e-ce-7e-64-39-49.

When a truncated SHA-256 hash output is used as an identifier of a service, a false match event may occur when the service name offered by an advertiser device is different from the service name sought by a seeker device and yet the two different service names happen to yield the same truncated hash output. The probability of false match is a function of the length of the truncated hash output. A sufficient length of the truncated SHA-256 hash output can produce relatively low probability of false match. As an example, the 6-octet (48-bit) Service Hash, as being specified in the WFDS draft specification in the WFA, yields a probability of false match of roughly $2^{-24}$ or $5.96 \times 10^{-8}$.

Device B 407 is seeking a service and service layer 415 may initiate a seekservice( ) procedure with ASP layer 416 (shown as event 426) with service_name_seeker of a service being sought by device B 407. ASP layer 416 may generate a hash of service_name_seeker (shown as event 428). The hash may be generated using a hashing function, such as SHA-256, for example. As with device A 405, device B 407 generates a Service Hash, which is the first 6 octets of the output of the hashing function. Device B 407 may transmit a P2P Probe Request including the Service Hash (shown as event 430).

Device A 405 may perform a check to determine if its Service Hash (generated from service_name_advertiser) matches the Service Hash received in the P2P probe request (generated from service_name_seeker) (shown as event 432). In general, in order for the Service Hashes to match, the hashing functions used to generate the Service Hashes have to be the same, the inputs to the hashing functions also have to be the same (with the exception of the false match as described above), and the truncation functions used have to be the same. If the Service Hashes match, device A 405 may transmit a P2P Probe Response including the service_name_advertiser of the matching Service Hash (shown as event 434). Device B 407 may perform a check to determine if the service_name_advertiser received from device A 405 matches the service_name_seeker. If there is a match, device B 407 may transit a Service Discovery Request frame with the service_name_seeker and a request for additional service information to device A 405 (shown as event 436).

Device A 405 may perform service name matching and service information matching (shown as event 438) and respond back with the requested additional service information in a Service Discovery Response frame (shown as event 440). It is noted that the full service name used in the Probe Response frame provides zero residual probability of false match between the service that the service seeker seeks and the service that the service advertiser advertises, assuming all service names are unique. The full service names used in the Service Discovery Request/Response frames serve as an identifier to form a binding between a service and the request or response of additional service information of that service that is carried in the Service Discovery Request or Service Discovery Response frame, respectively.

According to the example message exchange described above, the full service name carried in Probe Response, Service Discovery Request, and Service Discovery Response frames tends to be a much longer string than the truncated hash output of the service name, requiring extra signaling overhead. Substituting a short identifier of a fixed length for the full service name of a variable length may be advantageous. Furthermore, the service names in the Probe Response, Service Discovery Request, and Service Discovery Response frames are fully exposed to unintended parties, since these frames are not protected by security or privacy protection measures due to their nature of being pre-association. In certain applications, it is desirable to protect a user's privacy, for example, the services being offered or being sought by the user. In some cases, an identifier of a user's device or an identifier of the user himself/herself (such as a name or e-mail address) may be a part of the service name. Fully exposing the service name to unintended parties may leak the user's privacy in these cases. Therefore, measures may be needed to avoid exposing the service name in message exchanges during the pre-association state.

According to an example embodiment, a pre-association procedure may help to reduce signaling overhead by exchanging less service related information while helping to maintain an acceptable probability of false match. Furthermore, the pre-association procedure may help to maintain privacy of users by making it difficult for an eavesdropper to obtain information about the service, the device, or the user information that is being advertised or being sought.

According to an example embodiment, a truncated hash output of the service name may be used in each message frame where there is a need to identify the service during the pre-association state, for example, not only in the Probe Request frame, but also in the Probe Response frame, the Service Discovery Request frame, and the Service Discovery Response frame, and so on. The truncated hash outputs generated from the same service name for these message frames are different from each other. Matching between two corresponding truncated hash outputs, one received and one self-generated, is performed when each of these frames is received. The discovery procedure may proceed only if a match is found. Thus, a false match between two truncated hash outputs occurred in an earlier message frame remains undetected if and only if the false matches between the corresponding truncated hash outputs also occur in all subsequent message frames. In another word, a false match must happen at all stages in order for the false match remains finally undetected. According to probability theory, in order to minimize the probability that false matches have occurred in all relevant frames up to a given point during a pre-association discovery procedure, which is the residual false match probability at the given point, one needs to make these false match events totally independent of each other.

The example embodiments provides various methods for generating different truncated hash outputs from a given service name in a manner that these truncated hash outputs are totally uncorrelated to each other, so as to ensure that false matches of the truncated hash outputs occur totally independently in each different frame. Thus, the residual probability of false match in each subsequent frame is the product of probabilities of false match of the truncated hash outputs occurring in the current and all previous message frames. Therefore the residual probability of false match is reduced exponentially in each subsequent message frame. This provides the room for further reducing the length of each truncated hash output at each message frame, thus further reducing the signaling overhead in these message frames. Although the probability of false match at the initial message frame may be relatively high as a result of reduced length of the truncated hash output, a false match event occurred at the initial frame will likely be detected by the mismatch of the truncated hash output in a subsequent message frame. Then the service seeker or the service advertiser can determine that the service being sought and the service being advertised are in fact different. Thus, the service discovery procedure may be terminated immediately or after a negative response is sent to the peer with a proper result/reason code.

Figure 5:
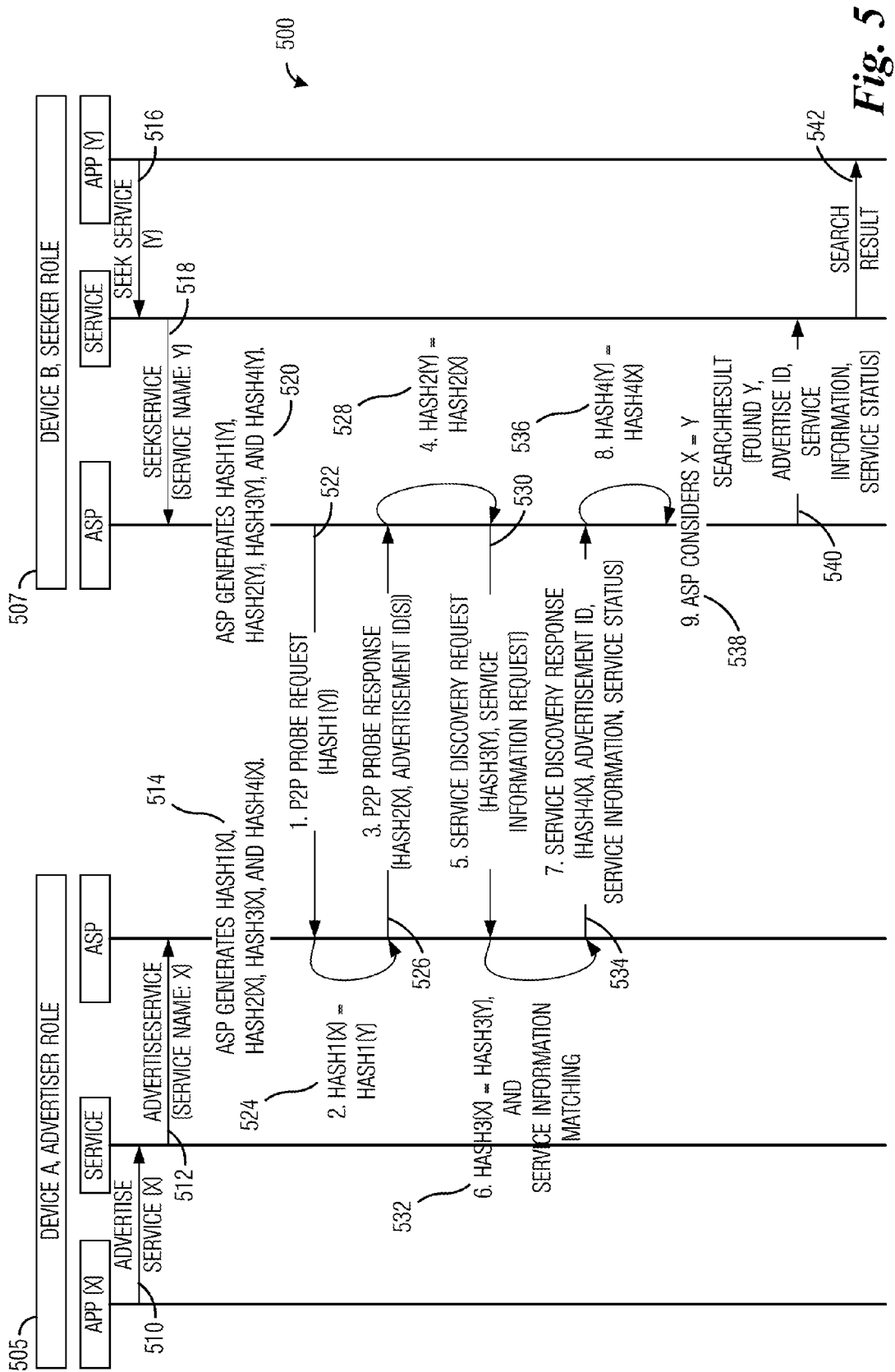
FIG. 5 illustrates an example message exchange diagram highlighting a pre-association discovery procedure that helps to protect privacy and to reduce signaling overhead while maintaining an acceptable probability of false match according to example embodiments described herein.

FIG. 5 illustrates an example message exchange diagram 500 highlighting a pre-association discovery procedure that helps to protect privacy and to reduce signaling overhead while maintaining an acceptable probability of false match.

Message exchange diagram 500 illustrates messages exchanged between a device A 505 and a device B 507. Device A 505 and device B 507 includes multiple layers, including application (APP) layers, service layers, and ASP layers. The details of the layers below the ASP layers, such as PHY layers and MAC layers, are intentionally omitted.

An application in Device A 505 may request to advertise a service X provided by the application (shown as event 510). The request may result in the initiation of an advertisement-service( ) procedure with a service_name_advertiser of service X (shown as event 512). Device A 505 may generate a plurality of truncated hash outputs of service_name_advertiser unique to different frame types (shown as event 514). An application in Device B 507 is seeking a service and may initiate a seekservice( ) procedure with service_name_seeker of a service Y being sought by device B 507 (shown as events 516 and 518). Device B 507 may generate a plurality of truncated hash outputs of service_name_seeker unique to different frame types (shown as event 520).

As an illustrative example of generating different and yet uncorrelated truncated hash outputs from a given service name, device A 505 may utilize four different truncations of the output of a hashing function utilizing service_name_advertiser of service X as input, with the four different truncated hash outputs denoted as Hash1( ), Hash2( ), Hash3( ), and Hash4( ). For discussion purposes, consider a situation where service_name_advertiser comprises a text string of "A", then Hash1(A)=Truncate1(Hash("A"));
Hash2(A)=Truncate2(Hash("A"));
Hash3(A)=Truncate3(Hash("A")); and
Hash4(A)=Truncate4(Hash("A")), where Hash( ) represents a common hashing function, such as SHA-256, and Truncate1( ), Truncate2( ), Truncate3( ), and Truncate4( ) represent four different truncation functions used for producing different truncated hash output based on a type of the frame that carries the truncated hash output. SHA-256 hash function has ideal cryptographic properties such that a portion of its hash output is generally totally uncorrelated to (or independent of) another portion of its hash output if these two portions have no overlapping region. Therefore, according to an example embodiment, the truncation functions have non-overlapping bit patterns, e.g., Truncate1( ) takes the first 6 octets of SHA-256 output, Truncate2( ) takes the second 6 octets of SHA-256 output, and so on. Device B 507 may utilize the same hashing function and Truncate1( ), Truncate2( ), Truncate3( ), and Truncate4( ) as device A 505 but with service_name_seeker of service Y as the input.

As another illustrative example of generating different and yet uncorrelated truncated hash outputs from a given service name, device A 505 may use a single truncation of an output of a hashing function utilizing different modified versions of service_name_advertiser of service X depending on the type of the frame that carries the truncated hash output. For discussion purposes, consider a situation where service_name_advertiser comprises a text string of "A", then Hash1(A)=Truncate(Hash("probe.request.A"));
Hash2(A)=Truncate(Hash("probe.response.A"));
Hash3(A)=Truncate(Hash("sd.request.A")); and
Hash4(A)=Truncate(Hash("sd.response.A")), where Hash( ) and Truncate( ) represent a common hash function, such as SHA-256, and a common truncation function, respectively, while a different prefix is added to service_name_advertiser for different frame types, and "probe.request.A" represents the process of appending the string "probe.request." to the service name string "A", since Hash1( ) function is used for the Probe Request frame, and so on for the processes of appending the other prefixes for the other types of frame, respectively. Device B 507 may utilize the same modification processes, the same hashing function, and the same truncation function as device A 505 but with service_name_seeker of service Y as the input. The ideal cryptographic properties of SHA-256 hash function ensure that the hash outputs of differently modified versions of the same service name are totally uncorrelated to each other, no matter how small the modifications are. Therefore, even if an identical truncation pattern is used for truncating, the truncated hash outputs are still uncorrelated to each other and a resulting false match probability is a product of individual false match probabilities of the individual truncated hash outputs.

It is noted that the appending of strings to beginning the service name string is intended for discussion purposes only, and that the strings may be appended to the end of the service name string, inserted into the middle of the service name string, interleaving the strings with the service name string, adding the strings to the service name string, multiplying the strings with the service name string, as well as any possible combination, permutation, or function involving the strings and the service name string may be used. Additionally, the modifying strings themselves are intended for discussion purposes only and that any possible strings that can uniquely identify the frames may be used as the modifying strings.

Device B 507 may transmit a P2P Probe Request frame with Hash1(Y) (shown as event 522). It is noted that the P2P Probe Request frame may include multiple Hash1( )s. As an example, a P2P Probe Request frame may include 3 Hash1( )s: Hash1(Y1), Hash2(Y2), and Hash2(Y3), where Y1, Y2, and Y3 are different services being sought by device B 507. Device A 505 may perform a check to determine if Hash1(X) is equal to Hash1(Y), which would indicate that the truncated hash outputs match and that there is a good probability (denoted as probability 1) that service_name_advertiser is the same as service_name_seeker (shown as event 524). In general, in order for Hash1(X) to be equal to Hash1(Y), the hashing functions used to generate the hashes have to be the same, and the truncation functions have to be the same. This can be ensured generally by compliance with pre-defined communications protocols and specifications by device A 505 and device B 507. If Hash1(X) is equal to Hash1(Y), device A 505 may transmit a P2P Probe Response frame with Hash2(X) (shown as event 526). Device B 507 may perform a check to determine if Hash2(Y) is equal to Hash2(X), which would indicate that the truncated hash outputs match and that there is a good probability (denoted as probability 2) that service_name_advertiser is the same as service_name_seeker (shown as event 528). If Hash2(Y) is equal to Hash2(X), device B 507 may transmit a Service Discovery Request frame with Hash3(Y) (shown as event 530). Device A 505 may perform a check to determine if Hash3(X) is equal to Hash3(Y), which would indicate that the truncated hash outputs match and that there is a good probability (denoted as probability 3) that service_name_advertiser is the same as service_name_seeker (shown as event 532). If Hash3(X) is equal to Hash3(Y), device A 505 may transmit a Service Discovery Response frame with Hash4(X) (shown as event 534). Device B 507 may perform a check to determine if Hash4(Y) is equal to Hash4(X), which would indicate that the truncated hash outputs match and that there is a good probability (denoted as probability 4) that service_name_advertiser is the same as service_name_seeker (shown as event 536).

In summary, the transmitting device of each of the four different types of frames as shown in FIG. 5 generates the truncated hash output of the service name of the transmitting device that corresponds to the type of the transmitted frame and sends it in the corresponding frame. The receiving device of each frame generates the truncated hash output of the service name of the receiving device that corresponds to the type of the received frame, then compares it with the received truncated hash output. If there is a match, the receiving device of the frame may proceed with the next step, e.g., transmitting the next frame based on the signaling flow of the protocol. Otherwise, the pre-association discovery procedure may be terminated immediately or after a negative response is sent to the peer with a proper result/reason code. As an example, in event 528 (step 4) as shown in FIG. 5, if Hash2(Y)≠Hash2 (X), device B 507 may terminate the discovery procedure immediately. As another example, in event 532 (step 6) as shown in FIG. 5, if Hash3(X)≠Hash3(Y), device A 505 may send a Service Discovery Response frame to device B 507 with a negative response and a reason code of "Mismatched Hash", without providing the requested service information. Then device B 507 may terminate the pre-association discovery procedure.

Therefore, in event 536 as shown in FIG. 5, if Hash4(Y) is equal to Hash4(X), it implies that Hash1(X) is equal to Hash1(Y), Hash2(Y) is equal to Hash2(X), and Hash3(X) is equal to Hash3(Y), because otherwise the protocol would not allow the frame exchange to proceed this far. Thus, in each subsequent frame, if the match between the corresponding truncated hash outputs persists, the probability that the two service names actually match becomes higher than in the previous frame. For example, probability 4 is higher than probability 3, probability 3 is higher than probability 2, and probability 2 is higher than probability 1. In the end, probability 4 is so high that device B 507 may consider that X=Y (service_name_seeker=service_name_advertiser) (shown as event 538). Device B 507 may process search results (shown as events 540 and 542), and as a result, it may proceed with the association process and/or making a connection with device A 505.

A false match, if it occurs and remains undetected, may cause miscommunications between devices. Thus, it is desirable to keep the false match probability as low as possible. As an example, the draft WFDS specification uses the full service name in the subsequent management frames after the Probe Request frame to avoid false match while incurring the price of higher signaling overheads in those frames.

According to an example embodiment, by using different and yet uncorrelated truncated hash outputs in different frames, e.g., by using different truncation functions with non-overlapping bit-patterns or by appending different prefixes to service name before going through the hashing function, the false match may occur independently in different frames, if an ideal cryptographic hash function, such as the SHA-256, is used. As a result, the residual false match probability in each subsequent frame is the product of false match probabilities of the corresponding truncated hash outputs in the current frame and in each of all previous frames. Therefore, the residual false match probability decreases exponentially in each subsequent frame. As an example, a 6-octet long truncated string for all truncated hash outputs in each of the four types of frames as shown in FIG. 5 may be used. The probability of false match after the Probe Request frame (i.e., in event 524, step 2) is roughly $2^{-24}$ or $5.96 \times 10^{-8}$. The probability of residual false match after the Probe Response frame (i.e., in event 528, step 4) is roughly $2^{-48}$ or $3.55 \times 10^{-15}$. The probability of residual false match after the SD Request frame (i.e., in event 532, step 6) is roughly $2^{-72}$ or $2.12 \times 10^{-22}$. The probability of residual false match after the SD Response frame (i.e., in event 536, step 8) is roughly $2^{-96}$ or $1.26 \times 10^{-29}$.

It is noted that these probabilities may be simply approximated as above, assuming an ideal cryptographic hash algorithm is used.

Therefore, the signaling overheads are reduced in the Probe Response and SD Request/Response frames, since truncated hash outputs with a length of a few octets are used comparing to full service names which are generally much longer than a few octets. The signaling protocol remains relatively robust as a false match event happened in an earlier frame will likely be detected by the mismatch in a subsequent frame. The residual false match probability at the end of the discovery procedure is virtually zero. Furthermore, since only truncated hash outputs of the service name are used in the message exchanges during the pre-association state, the privacy of the service information, device information, or user information is protected.

Figure 6A:
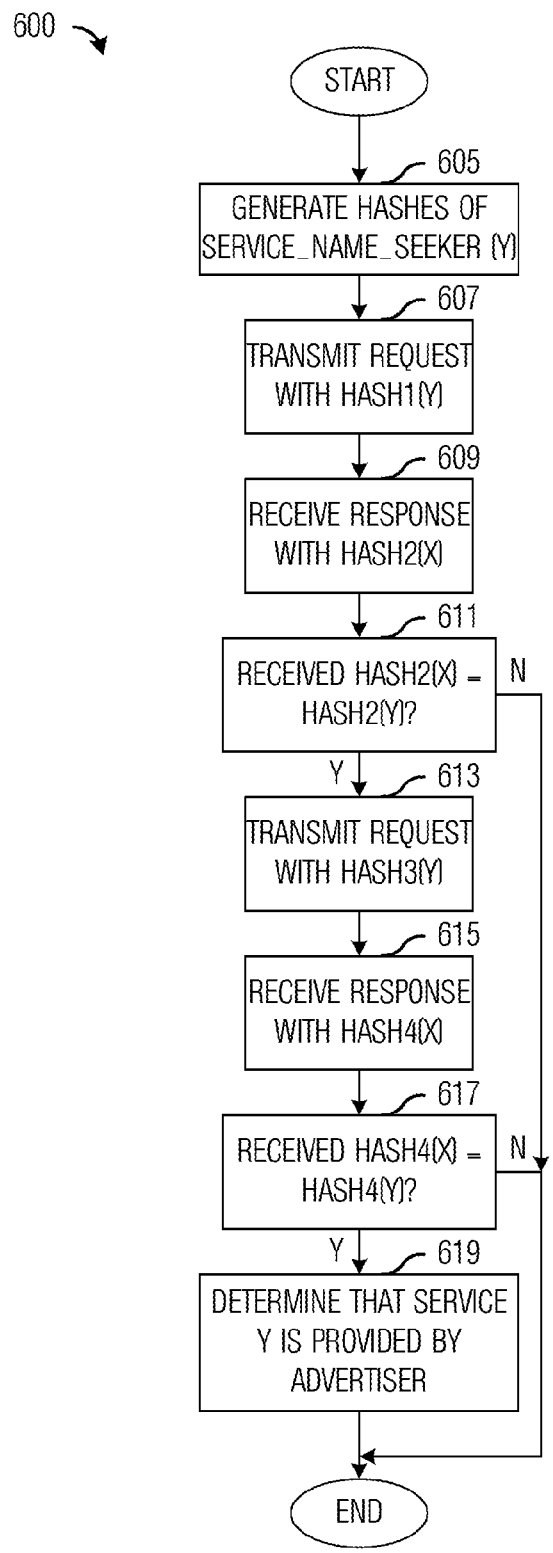
FIG. 6*a* illustrates a flow diagram of first example operations occurring in a seeker device as the seeker device performs a pre-association discovery procedure according to example embodiments described herein.

FIG. 6a illustrates a flow diagram of first example operations 600 occurring in a seeker device as the seeker device performs a pre-association discovery procedure. Operations 600 may be indicative of operations occurring in a seeker device, such as device B 507, as the seeker device performs a pre-association discovery procedure.

Operations 600 may begin with the seeker device generating a plurality of truncated hash outputs of service_name_seeker of a service Y being sought by the seeker device (block 605). The plurality of truncated hash outputs may comprise multiple, preferably non-overlapping, truncations of a single hash output or identical truncations of multiple hash outputs as functions of service_name_seeker and different frame types. The seeker device may transmit a Probe Request frame with a first truncated hash output Hash1(Y) (block 607). The seeker device may receive a Probe Response frame with a second truncated hash output Hash2(X), where X is a service_name_advertiser of service X of an advertiser device (block 609). The seeker device may perform a check to determine if Hash2(Y) is equal to Hash2(X) (block 611).

If Hash2(Y) is not equal to Hash2(X), the seeker device may terminate the pre-association discovery. If Hash2(Y) is equal to Hash2(X), the seeker device may transmit a Service Discovery Request frame with a third truncated hash output Hash3(Y) (block 613). The seeker device may receive a Service Discovery Response frame with a fourth truncated hash output Hash4(X) (block 615). The seeker device may perform a check to determine if Hash4(Y) is equal to Hash4(X) (block 617). If Hash4(Y) is not equal to Hash4(X), the seeker device may terminate the pre-association discovery. If Hash4(Y) is equal to Hash4(X), the seeker device may determine that service Y is found and is provided by the advertiser device (block 619). As a result, the seeker device may further initiate an association procedure and/or set up a connection with the advertiser device.

Figure 6B:
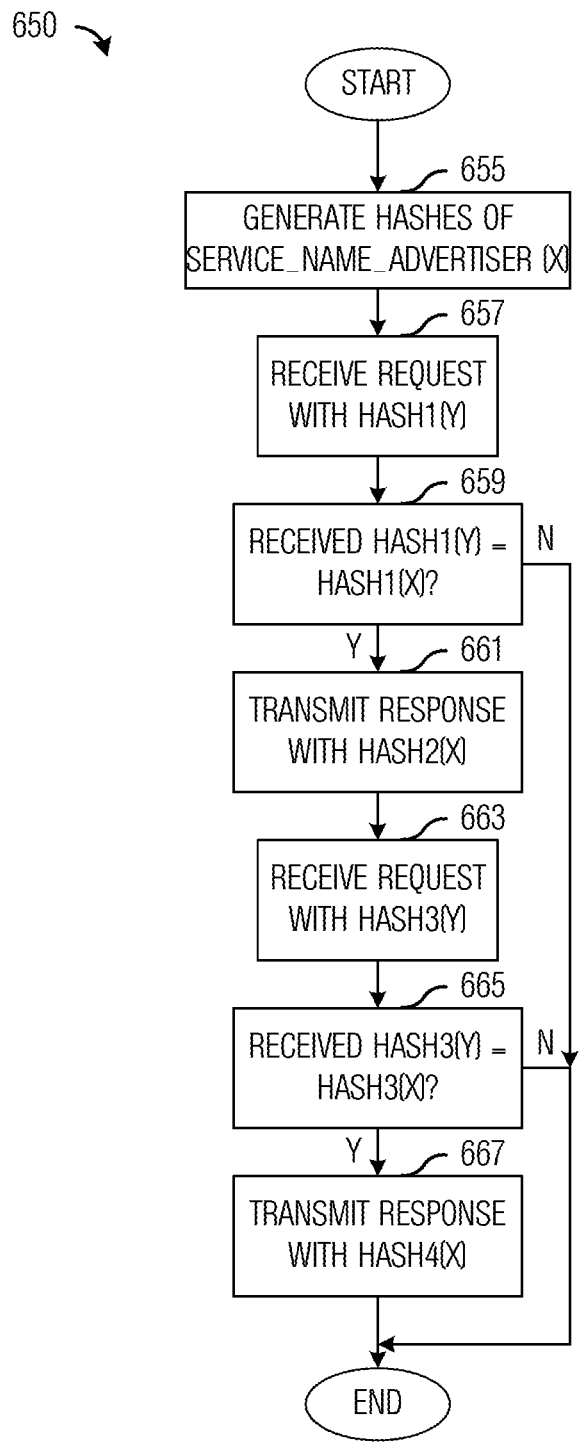
FIG. 6b illustrates a flow diagram of first example operations occurring in an advertiser device as the advertiser device performs a pre-association discovery procedure according to example embodiments described herein.

FIG. 6b illustrates a flow diagram of first example operations 650 occurring in an advertiser device as the advertiser device performs a pre-association discovery procedure. Operations 650 may be indicative of operations occurring in an advertiser device, such as device A 405 or device A 505, as the advertiser device performs a pre-association procedure.

Operations 650 may begin with the advertiser device generating a plurality of truncated hash outputs of service_name_advertiser of a service X being provided by the advertiser device (block 655). The plurality of truncated hash outputs may comprise multiple, preferably non-overlapping truncations of a single hash output or identical truncations of multiple hash outputs as functions of service_name_advertiser and different frame types. The advertiser device may receive a Probe Request frame with a first truncated hash output Hash1(Y), where Y is a service_name_seeker of service Y of a seeker device (block 657). The advertiser device may perform a check to determine if Hash1(X) is equal to Hash1(Y) (block 659).

If Hash1(X) is not equal to Hash1(Y), the advertiser device may terminate the pre-association discovery, e.g., by transmitting a Probe Response frame with a negative response. If Hash1(X) is equal to Hash1(Y), the advertiser device may transmit a Probe Response frame with a second truncated hash output Hash2(X) (block 661). The advertiser device may receive a Service Discovery Request frame with a third truncated hash output Hash3(Y) (block 663). The advertiser device may perform a check to determine if Hash3(X) is equal to Hash3(Y) (block 665). If Hash3(X) is not equal to Hash3 (Y), the advertiser device may terminate the pre-association discovery, e.g., by transmitting a Service Discovery Response frame with a negative response. If Hash3(X) is equal to Hash3 (Y), the advertiser device may transmit a Service Discovery Response with a fourth truncated hash output Hash4(X) (block 667). If the advertiser device further receives an association request from the seeker device, it may complete an association procedure with the seeker device.

Figure 7:
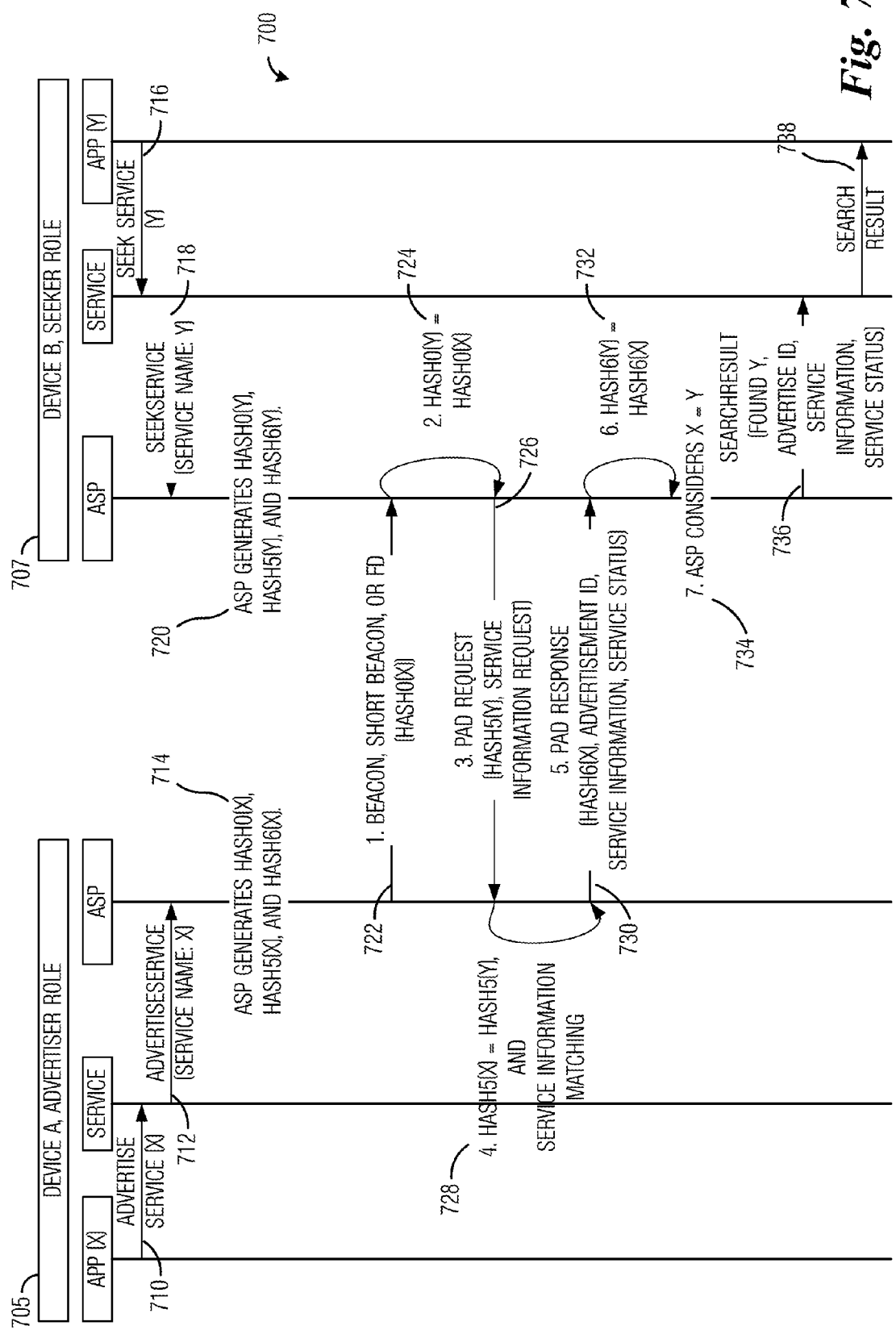
FIG. 7 illustrates a first alternative example message exchange diagram highlighting a pre-association discovery procedure according to example embodiments described herein.

FIG. 7 illustrates a first alternative example message exchange diagram 700 highlighting a pre-association discovery procedure. Message exchange diagram 700 illustrates messages exchanged between a device A 705 and a device B 707. Device A 705 and device B 707 includes multiple layers, including application (APP) layers, service layers, and ASP layers. The details of the layers below the ASP layers, such as PHY layers and MAC layers, are intentionally omitted.

An application in Device A 705 may request to advertise a service X provided by the application (shown as event 710). The request may result in the initiation of an advertisement-service( ) procedure with a service_name_advertiser of service X (shown as event 712). Device A 705 may generate a plurality of truncated hash outputs of service_name_advertiser unique to different frame types (shown as event 714). An application in Device B 707 is seeking a service and may initiate a seekservice( ) procedure with service_name_seeker of a service Y being sought by device B 707 (shown as events 716 and 718). Device B 707 may generate a plurality of truncated hash outputs of service_name_seeker unique to different frame types (shown as event 720).

Device A 705 may periodically broadcasts, in the Beacon frame, Short Beacon frame, or Fast Initial Link Setup (FILS) Discovery (FD) frame, Hash0(X), which is a truncated hash output of service_name_advertiser that device A 705 wishes to advertise (shown as event 722), where Hash0( ) represents the function for generating the truncated hash output of an input, such as a service name, for the Beacon frame, Short Beacon frame, or FD frame. Device B 707 may perform a check to determine if Hash0(X) is equal to Hash0(Y) (block 724). In other words, device B 707 checks to determine if the truncated hash output, corresponding to the frame type of Beacon frame, Short Beacon frame, and FD frame, of service_name_seeker that device B 707 seeks matches with the truncated hash output received from the Beacon, Short Beacon, or FD frame. In general, in order for Hash0(X) to be equal to Hash0(Y), the hashing functions used to generate the hashes have to be the same, and the truncation functions have to be the same. This can be ensured generally by compliance with pre-defined communications protocols and specifications by device A 705 and device B 707. Device B 707 transmits a Pre-Association Discovery (PAD) Request frame with the truncated hash output, corresponding to the frame type of PAD Request frame (i.e., Hash5(Y), where Hash5( ) represents the function for generating the truncated hash output of an input, such as a service name, for the PAD Request frame), of the service_name_seeker, together with a request of service information of that service (shown as even 726).

Device A 705 may perform a check to determine if Hash5 (X) is equal to Hash5(Y) (shown as event 728). In other words, device A 705 determines if the truncated hash output, corresponding to the frame type of PAD Request frame, of the service_name_advertiser that device A 705 advertises matches with the truncated hash output received from the PAD Request frame. If the two truncated hash outputs match, device A 705 may transmit a Pre-Association Discovery (PAD) Response frame with the truncated hash output, corresponding to the frame type of PAD Response frame (i.e., Hash6(X), where Hash6( ) represents the function for generating the truncated hash output of an input, such as a service name, for PAD Response frame), of the service_name_advertiser that the service advertiser advertises, together with the requested service information, the service (availability) status, and an transaction identifier of that service (shown as event 730). Device B 707 may perform a check to determine if Hash6(Y) is equal to Hash6(X) (shown as event 732). In other words, device B 707 may determines if the truncated hash output, corresponding to the frame type of PAD Response frame, of the service_name_seeker that device B 707 seeks matches with the truncated hash output received from the PAD Response frame. If the two truncated hash outputs match, device B 707 considers service X is equal to service Y (shown as event 734). If the received service information also meets the requirements of the service seeker, the device B 707 may consider the requested service Y is found and may further inform the corresponding application. As a result, for example, device B 707 may initiate subsequent procedures such as authentication and provisioning negotiation, which eventually leads to a connection being set up between device A 705 and device B 707.

Figure 8:
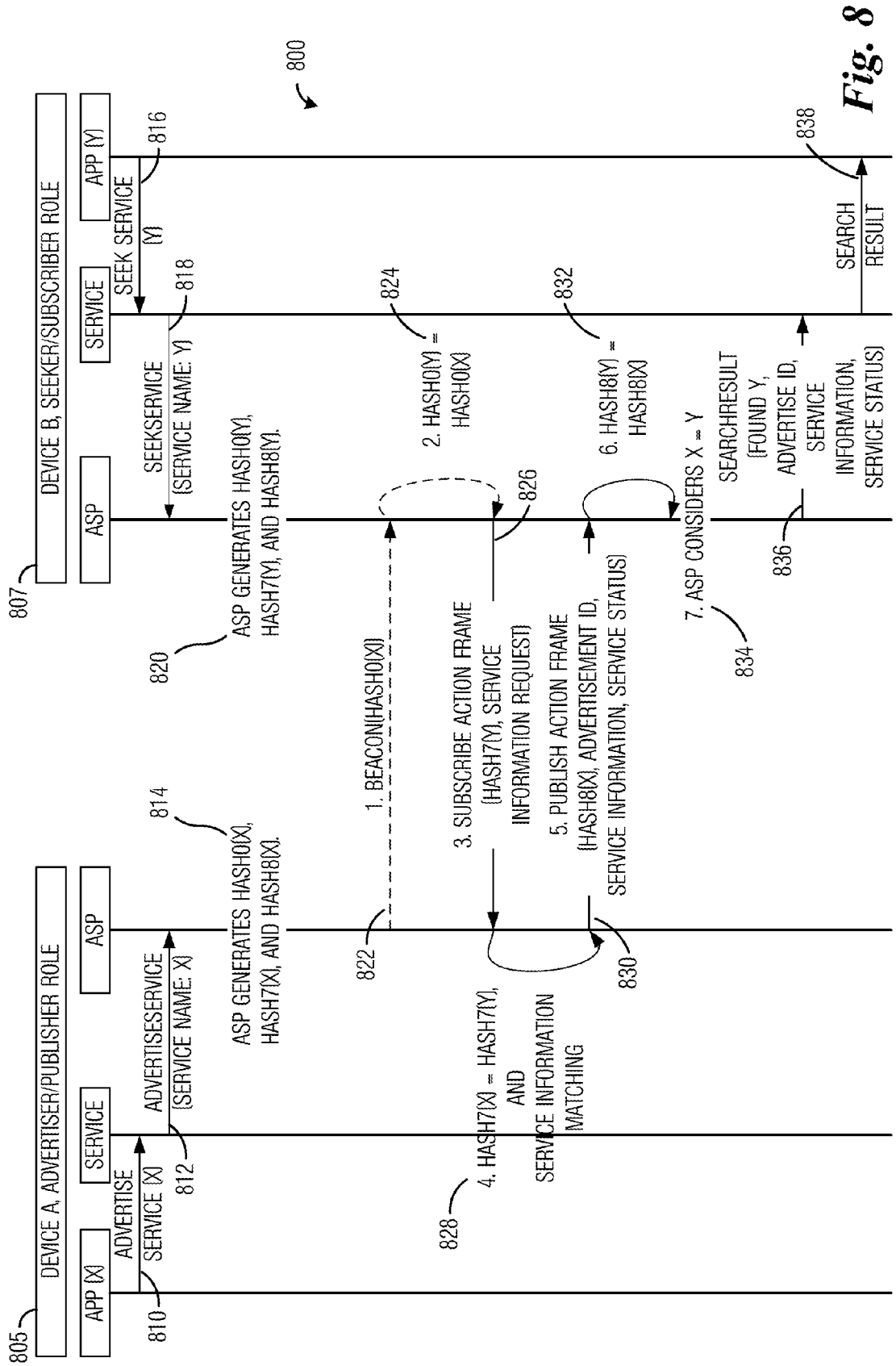
FIG. 8 illustrates a second alternative example message exchange diagram highlighting a pre-association discovery procedure according to example embodiments described herein.

FIG. 8 illustrates a second alternative example message exchange diagram 800 highlighting a pre-association discovery procedure. Message exchange diagram 800 illustrates messages exchanged between a device A 805 and a device B 807. Device A 805 and device B 807 includes multiple layers, including application layers, service layers, and ASP layers. The details of the layers below the ASP layers, such as PHY layers and MAC layers, are intentionally omitted.

An application in Device A 805 may request to advertise a service X provided by the application (shown as event 810). The request may result in the initiation of an advertisement-service( ) procedure with a service_name_advertiser of service X (shown as event 812). Device A 805 may generate a plurality of truncated hash outputs of service_name_advertiser unique to different frame types (shown as event 814). Device B 807 is seeking a service and may initiate a seekservice( ) procedure with service_name_seeker of a service Y being sought by device B 807 (shown as events 816 and 818). Device B 807 may generate a plurality of truncated hash outputs of service_name_seeker unique to different frame types (shown as event 820).

Device A 805 may or may not periodically broadcasts, in the Beacon frame, Short Beacon frame, or Fast Initial Link Setup (FILS) Discovery (FD) frame, Hash0(X), which is a truncated hash output of service_name_advertiser that device A 805 wishes to advertise (shown as event 822). Hash0( ) represents the function for generating the truncated hash output of an input, such as a service name, for the Beacon frame, Short Beacon frame, or FD frame. If device B 807 receives the Beacon frame, Short Beacon frame, or FD frame, device B 807 may perform a check to determine if Hash0(X) is equal to Hash0(Y) (shown as event 824). In general, in order for Hash0(X) to be equal to Hash0(Y), the hashing functions used to generate the hashes have to be the same, and the truncation functions have to be the same. This can be ensured generally by compliance with pre-defined communications protocols and specifications by device A 805 and device B 807.

If Hash0(X) is equal to Hash0(Y), device B 807 may transmit a Subscribe frame with Hash7(Y) (shown as event 826). In addition, in the absence of receiving a Beacon frame, a Short Beacon frame, or an FD frame, device B 807 may periodically transmit a Subscribe frame, in a broadcast or multicast manner, to query devices operating in the surrounding area if they have a service that device B 807 seeks (shown as event 826). The truncated hash output, corresponding to the frame type of Subscribe frame (i.e., Hash7(Y), where Hash7( ) represents the function for generating the truncated hash output of an input, such as a service name, for the Subscribe frame), of service_name_seeker is included in the Subscribe frame. Device A 805 may perform a check to determine if Hash7(X) is equal to Hash7(Y) (shown as event 828). If a match is found (i.e., Hash7(X) is equal to Hash7(Y)), device A 805 may transmit a Publish frame with the service information requested, including a service handle (i.e. the Advertisement ID) used as a reference to the service during a subsequent service provisioning procedure (shown as event 830). A truncated hash output, corresponding to the frame type of Publish frame (i.e., Hash8(X), where Hash8( ) represents the function for generating the truncated hash output of an input, such as a service name, for the Publish frame), of service_name_advertiser is also included in the Publish frame. In a neighbor-awareness networking type of application, a requirement may be to keep the power consumption at device A 805 (the advertiser device) and device B 807 (the seeker device) as low as possible while they periodically transmit the Publish or Subscribe frames, respectively. Since Wi-Fi effectively uses a timer division multiple access (TDMA) scheme, it has been suggested that having a synchronization scheme to keep all Publish and Subscribe frames close in time can help to keep the power consumption low. In this sense, it is advantageous to use the truncated hash output of the service name, instead of the longer and length-variable full service name, in the Publish or Subscribe frames, since the truncated hash output has a shorter and fixed length, making the frame size of the Publish or Subscribe frame shorter and, more importantly, more predictable, therefore making it easier to align the Publish and Subscribe frames sent by different devices.

Different hash algorithms certainly can be used for generating different truncated hash outputs for different frames. However, it may not be easy to find many good cryptographic hash algorithms. Hash collisions have been found on the well-known MD5, SHA-0, and SHA-1 algorithms, leaving SHA-2 the remaining set of cryptographic hash algorithms that has been widely used and hasn't been broken yet. SHA-256 is a member of the SHA-2 family of hash algorithms and has been widely used. According to an example embodiment, a common hash function, such as SHA-256, may be used for all frame types. This also helps to keep the implementation simple.

Figure 9:
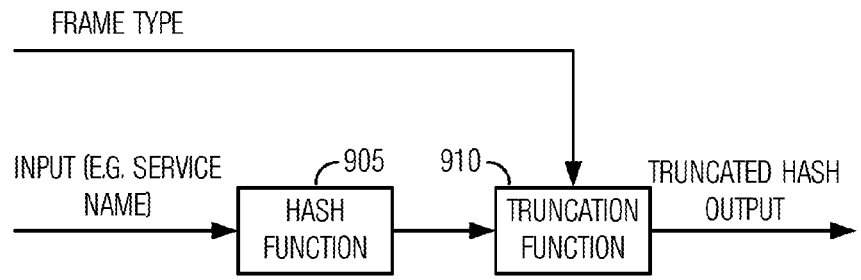
FIG. 9 illustrates a first example unit for generating different truncated hash output using a common hash function according to example embodiments described herein.

FIG. 9 illustrates a first example unit 900 for generating different truncated hash output using a common hash function. As shown in FIG. 9, a hash function unit 905 takes the Input, which may be a service name or a person's name, and generates the hash output for it, then a truncation function unit 910 carves out different portion of the hash output to produce the truncated hash output based on the type of the frame that carries the truncated hash output. As an example, the output of SHA-256 hash function is 256-bit or 32-octet long, of which the first 6 octets can be used for Probe Request frame, the next 6 octets can be used for Probe Response frame, and the 6 octets after that can be used for Service Discovery Request frame, and so on. In this example, the truncation bit patterns, i.e., the first 6 octets, the second 6 octets, and the like, for different types of the frame don't overlap with each other at all. Then, given the ideal cryptographic properties of SHA-256 hash function, the false match events on individual pairs of truncated hash outputs are totally uncorrelated. Thus, the residual false match probability, after matches being found on N pairs of truncated hash outputs, is the product of the false match probabilities on N individual pairs, thereby decreasing exponentially. Therefore, when the truncation-based approach is used to generate different truncated hash outputs from the same service name, it is preferred that the truncation bit patterns don't overlap with each other. It is noted that the above example is intended for discussion purposes and other ways for truncating the output of hash function unit 905 may be possible.

Figure 10:
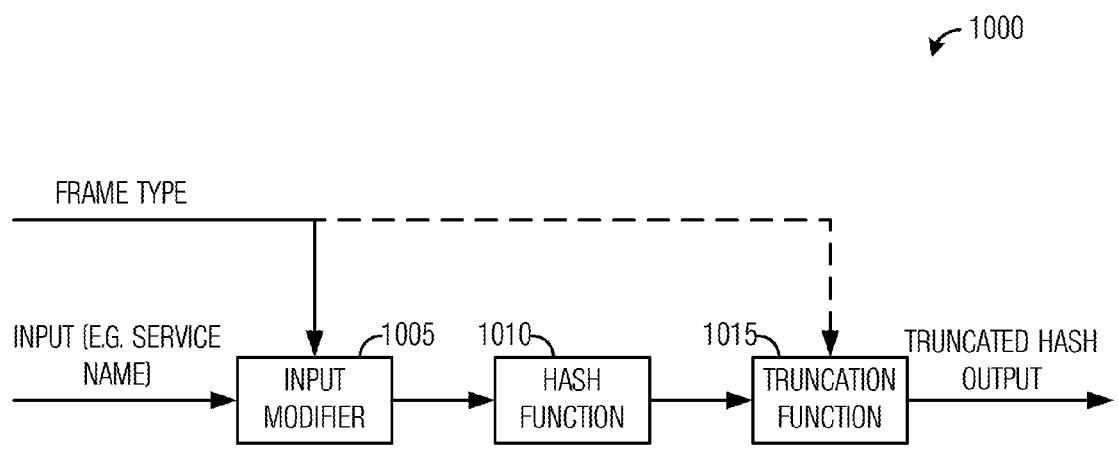
FIG. 10 illustrates a second example unit for generating different truncated hash output using a common hash function according to example embodiments described herein.

FIG. 10 illustrates a second example unit 1000 for generating different truncated hash output using a common hash function. As shown in FIG. 10, first, an input modifier unit 1005 modifies the Input to produce a modified Input based on the frame type. As an example, a string of "probe.request." may be placed as the prefix to the Input string to produce the modified Input string if the frame type is the Probe Request frame, and a string of "probe.response." may be placed as the prefix to the Input string to produce the modified Input string if the frame type is the Probe Response frame, and the like. A hash function unit 1010 may take the modified Input produced by input modifier unit 1005 and generates the hash output for it. A truncation function unit 1015 may shorten the hash output. A single truncation function may be implemented in truncation function unit 1015 to simplify implementation as the number of frame types increases.

Figure 11:
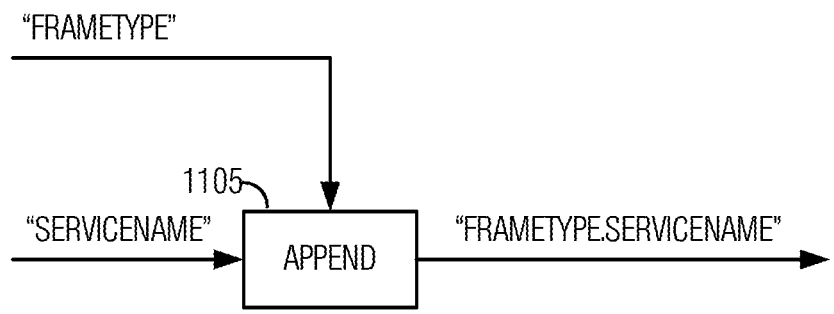
FIG. 11 illustrates a first example Input Modifier unit according to example embodiments described herein.

FIG. 11 illustrates a first example Input Modifier unit 1100. An append unit 1105 appends its two inputs together to produce its output. Other units, such as interleave, add, multiply, and the like, may be used in place of append unit 1105.

Figure 12:
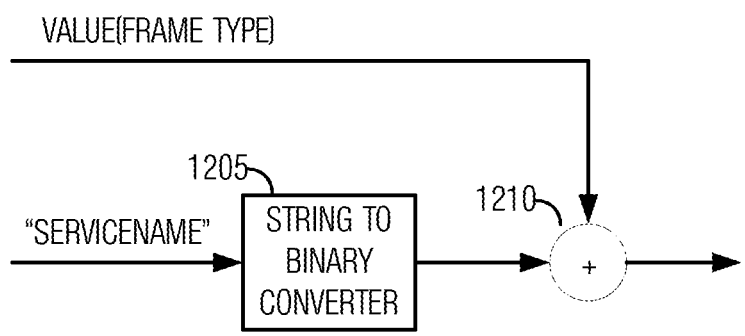
FIG. 12 illustrates a second example Input Modifier unit according to example embodiments described herein.

FIG. 12 illustrates a second example Input Modifier unit 1200, wherein a different numeric value may be added to the numeric value of the Input arithmetically to produce the modified Input based on the frame type. A string to binary converter 1205 may convert a text input to a numerical value or a sequence of numerical values, which may be added up with a frame type value by adder 1210.

Then as shown in FIG. 10, Hash Function unit 1010 may hash the modified Input, from Input Modifier 1100 or 1200, to produce the hash output. Truncation Function unit 1015 carves out a portion of the hash output to produce the truncated hash output. Truncation Function unit 1015 may be common for all frame types for simple implementation, or it may be dependent on the frame type to further optimize the truncation length for each type of frame based on the tradeoff between the signaling overhead and residual false match probability at each frame. Since the Input Modifier block can be as simple as appending a given prefix to a given Input string, as illustrated in FIG. 11, even when a new type of frame is defined later, the new prefix (for the new type of frame) may be generated by the software and be provided to the functional blocks for generating the new type of truncated hash output, without changing the existing implementation of these functional blocks, which may be implemented in hardware.

Figure 13:
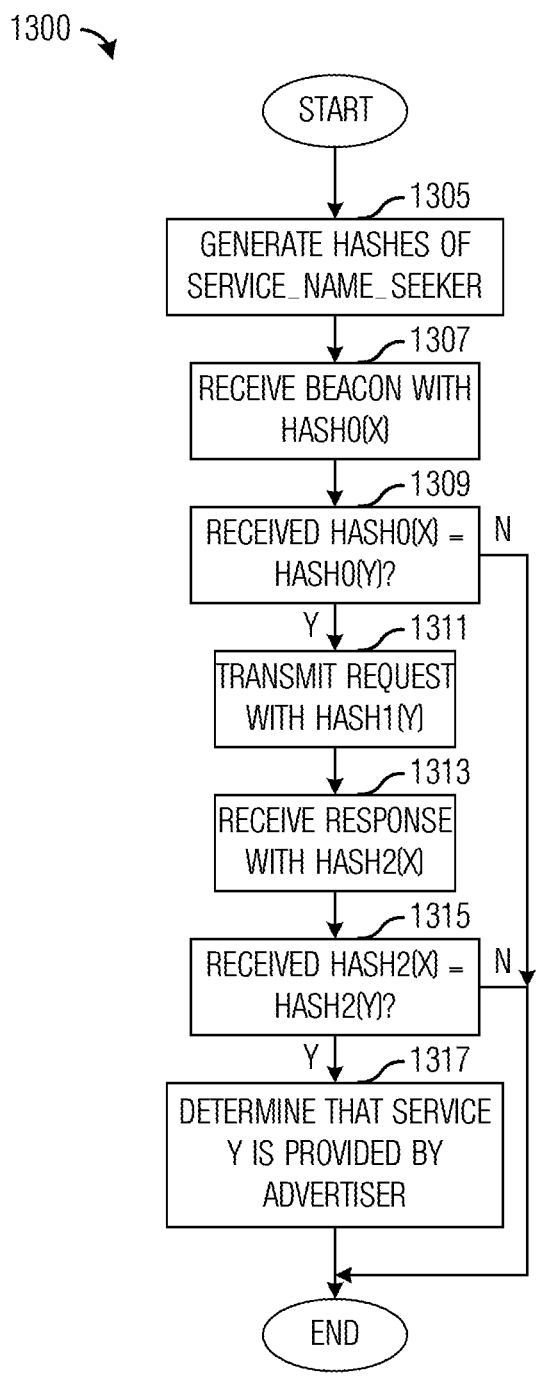
FIG. 13 illustrates a flow diagram of second example operations occurring in a seeker device as it participates in a pre-association procedure according to example embodiments described herein.

FIG. 13 illustrates a flow diagram of second example operations 1300 occurring in a seeker device as it participates in a pre-association procedure. Operations 1300 may be indicative of operations occurring in a seeker device, such as device B 707 and device B 807, as the seeker device as it participates in a pre-association procedure.

Operations 1300 may begin with the seeker device generating a plurality of truncated hash outputs of service_name_seeker of a service Y being sought by the seeker device (block 1305). The plurality of truncated hash outputs may comprise multiple, preferably non-overlapping, truncations of a single hash output or identical truncations of multiple hash outputs as functions of service_name_seeker and different frame types. The seeker device may receive a Beacon frame, Short Beacon frame, or FD frame including a truncated hash output of service_name_advertiser for service X, denoted Hash0(X) (block 1307). The seeker device may perform a check to determine if Hash0(X) is equal to Hash0(Y) (block 1309). In other words, the seeker device may perform the check to determine if the truncated hash output of service_name_advertiser for service X matches a truncated hash output of service_name_seeker of sought service Y. If Hash0(X) is not equal to Hash0(Y), operations 1300 may terminate.

If Hash0(X) is equal to Hash0(Y), the seeker device may transmit a request frame, such as a PAD Request frame or a Subscribe frame, with Hash1(Y) (block 1311). The seeker device may receive a response frame, such as a PAD Response frame or a Publish frame, with Hash2(X) (block 1313). The seeker device may perform a check to determine if Hash2(X) is equal to Hash2(Y) (block 1315). If Hash2(X) is not equal to Hash2(Y), operations 1300 may terminate. If Hash2(X) is equal to Hash2(Y), the seeker device may determine that service Y is found and is provided by the advertiser device (block 1317). And as a result, the seeker device may complete a connection procedure with the advertiser device.

Figure 14:
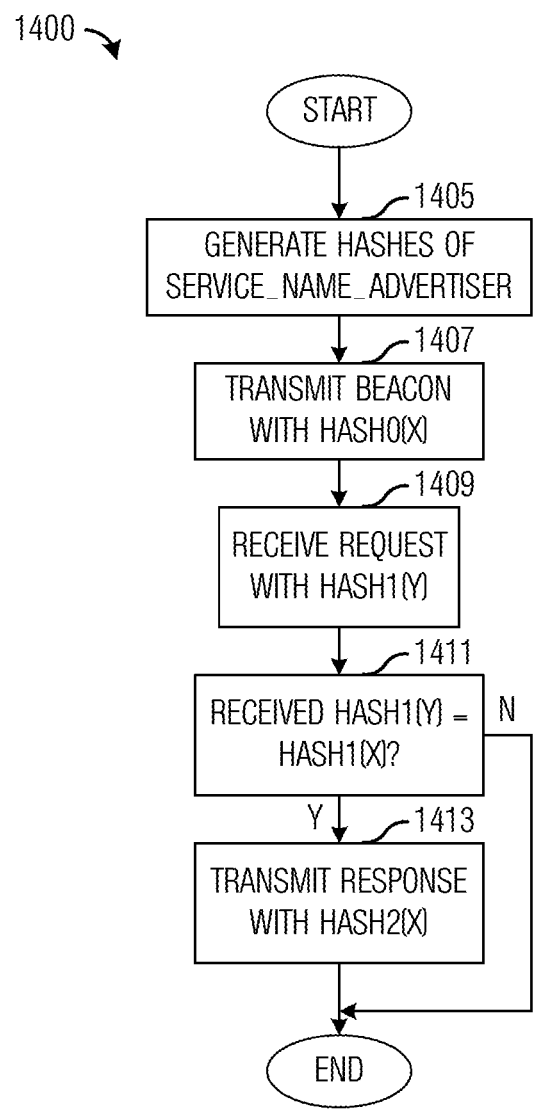
FIG. 14 illustrates a flow diagram of second example operations occurring in an advertiser device as it participates in a pre-association procedure according to example embodiments described herein.

FIG. 14 illustrates a flow diagram of second example operations 1400 occurring in an advertiser device as it participates in a pre-association procedure. Operations 1400 may be indicative of operations occurring in an advertiser device, such as device A 705 and device A 805, as the advertiser device as it participates in a pre-association procedure.

Operations 1400 may begin with the advertiser device generating a plurality of truncated hash outputs of service_name_advertiser of a service X being advertised by the advertiser device (block 1405). The plurality of truncated hash outputs may comprise multiple, preferably non-overlapping, truncations of a single hash output or identical truncations of multiple hash outputs as functions of service_name_advertiser and different frame types. The advertiser device may broadcast a Beacon frame, Short Beacon frame, or FD frame including a truncated hash output of service_name_advertiser for service X, denoted Hash0(X) (block 1407).

The advertiser device may receive a request, such as a PAD Request frame or a Subscribe frame, with Hash1(Y) (block 1409). The advertiser device may perform a check to determine if Hash1(Y) is equal to Hash1(X) (block 1411). If Hash1(Y) is not equal to Hash1(X), the advertiser device may transmit a Response frame with a negative response, then operations 1400 may terminate. If Hash1(Y) is equal to Hash1(X), the advertiser device may transmit a Response frame, such as a PAD Response frame or a Publish frame, with Hash2(X) and the service information that is being requested (block 1413).

In general, different types of frames may be sent at different stages during the pre-associate discovery procedure to achieve different purposes. However, it is also possible that one type of frame is sent at different stages during the pre-associate discovery procedure to achieve different purposes. As an example, the same type of frame, such as a public action frame, may be sent for a different purpose when it contains a different type of information element, field, or attribute.

Therefore, although the illustrations and descriptions provided so far highlight the embodiments that different truncated hash outputs are generated for different types of frames that carry the truncated hash outputs, it should be considered these are intended as illustrative examples. It is entirely within the spirit of the present embodiments that a single type of frame may be sent at different stages during the pre-association discovery procedure to achieve different purposes by carrying different types of information elements, fields, and/or attributes. Thus a different truncated hash output may be generated for each different purpose of the frame, and the purpose of the frame may be determined by the type of an information element, field, or attribute contained in the frame. As an example, in the example illustrated in FIG. 7 and described before, the PAD Request frame and PAD Response frame may be replaced by a public action frame. When the public action frame contains a PAD Request element, it is sent for the purpose of sending a PAD request and a first truncated hash output is used. When the public action frame contains a PAD Response element, it is sent for the purpose of sending a PAD response and a second truncated hash output is used. Generally, the type of an element may be indicated by an identifier in the header portion of the element. As another example, in the example illustrated in FIG. 8 and described before, the Subscribe frame and the Publish frame may be replaced by a public action frame. When the public action frame contains a Subscribe attribute or an attribute that indicates Subscribe function, the public action frame is send for the purpose of subscribing a service and a first truncated hash output is used. When the public action frame contains a Publish attribute or an attribute that indicates Publish function, the public action frame is send for the purpose of publishing a service and a second truncated hash output is used. Generally, the type of an attribute may be indicated by an identifier in the header portion of the attribute. However, it is entirely possible that the function of an attribute may be indicated by additional control fields.

Figure 15:
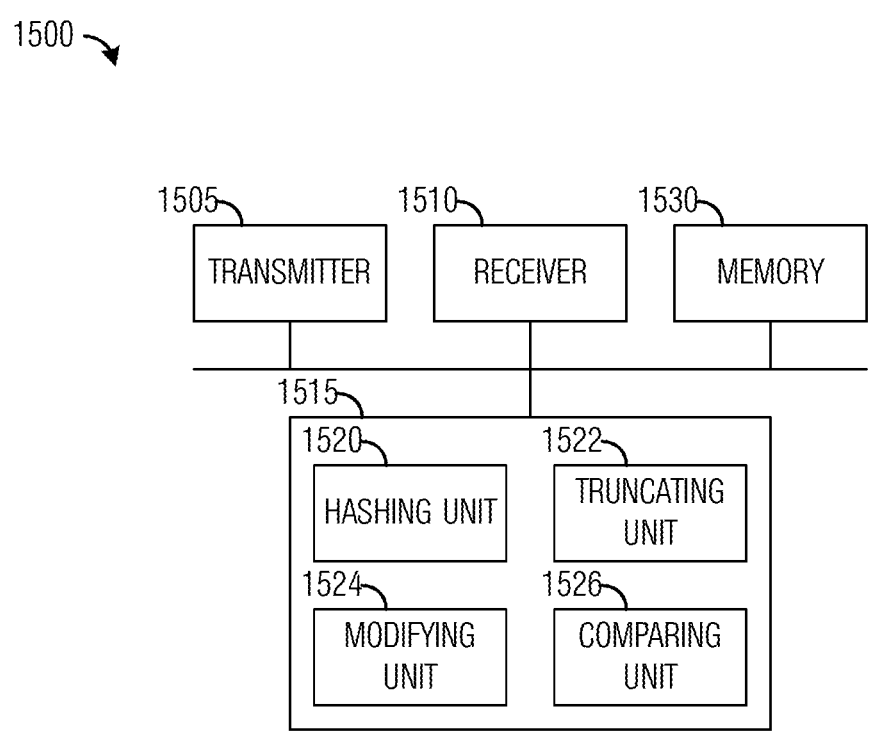
FIG. 15 illustrates an example communications device according to example embodiments described herein.

FIG. 15 illustrates an example communications device 1500. Communications device 1500 may be an implementation of a seeker device, an advertiser device, and the like. Communications device 1500 may be used to implement various embodiments discussed herein. As shown in FIG. 15, a transmitter 1505 is configured to transmit packets, frames, and the like. Communications device 1500 also includes a receiver 1510 that is configured to receive packets, frames, and the like.

A hashing unit 1520 is configured to generate a hash output for an input using a hashing function, such as SHA-256. A truncating unit 1522 is configured to truncate a hash output provided by hashing unit 1520. Truncating unit 1522 is configured to truncate the hash output by a specified amount. A modifying unit 1524 is configured to modify a first input with a second input. Modifying unit 1524 may append, interleave, add, subtract, apply a function, and the like, to the first input and/or the second input. A comparing unit 1526 is configured to compare two inputs, such as truncated hash values and determine if they match (or are equal). A memory 1530 is configured to store frames, service names, strings, hash functions, hash outputs, truncated hash outputs, and the like.

The elements of communications device 1500 may be implemented as specific hardware logic blocks. In an alternative, the elements of communications device 1500 may be implemented as software executing in a processor, controller, application specific integrated circuit, or so on. In yet another alternative, the elements of communications device 1500 may be implemented as a combination of software and/or hardware.

As an example, receiver 1510 and transmitter 1505 may be implemented as a specific hardware block, while hashing unit 1520, truncating unit 1522, modifying unit 1524, and comparing unit 1526 may be software modules executing in a microprocessor (such as processor 1515) or a custom circuit or a custom compiled logic array of a field programmable logic array. Hashing unit 1520, truncating unit 1522, modifying unit 1524, and comparing unit 1526 may be modules stored in memory 1530.

Although the present disclosure and its advantages have been described in detail, it should be understood that various changes, substitutions and alterations can be made herein without departing from the spirit and scope of the disclosure as defined by the appended claims.

What is claimed is:

1. A method for operating a seeker device, the method comprising:
   generating, by the seeker device, a first seeker truncated hash output from a sought service name;
   generating, by the seeker device, a second seeker truncated hash output from the sought service name, wherein the first seeker truncated hash output and the second seeker truncated hash output are uncorrelated;
   transmitting, by the seeker device, a first request message including the first seeker truncated hash output;
   receiving, by the seeker device, a first response message from an advertiser device, the first response message including a second advertiser truncated hash output generated from an advertised service name, wherein the first seeker truncated hash output matches a first advertiser truncated hash output generated from the advertised service name; and
   determining, by the seeker device, that the advertised service name matches the sought service name in response to determining that the second advertiser truncated hash output matches the second seeker truncated hash output.

2. The method of claim 1, the method further comprising initiating, by the seeker device, an association procedure with the advertiser device in response to determining that the advertised service name matches the sought service name.

3. The method of claim 1, wherein generating the first seeker truncated hash output comprises truncating a first part of a hash output of a hashing function with the sought service name as input, and generating the second seeker truncated hash output comprises truncating a second part of the hash output of the hashing function with the sought service name as input.

4. The method of claim 3, wherein the first part of the hash output and the second part of the hash output are not overlapping with each other.

5. The method of claim 1, wherein generating the first seeker truncated hash output comprises:
   modifying the sought service name with a first modifying function to produce a first modified sought service name;
   generating a first hash output with a hashing function and the first modified sought service name; and
   truncating the first hash output.

6. The method of claim 1, wherein generating the second seeker truncated hash output comprises:
   modifying the sought service name with a second modifying function to produce a second modified sought service name;
   generating a second hash output with the hashing function and the second modified sought service name; and
   truncating the second hash output.

7. The method of claim 1, wherein the first request message is a Probe Request frame and the first response message is a Probe Response frame.

8. The method of claim 7, further comprising:
   generating a third seeker truncated hash output from the sought service name;
   generating a fourth seeker truncated hash output from the sought service name;
   transmitting a second request message including the third seeker truncated hash output in response to determining that the advertised service name matches the sought service name; and
   receiving a second response message from the advertiser device, the second response message including a fourth advertiser truncated hash output generated from the advertised service name, wherein the third seeker truncated hash output matches a third advertiser truncated hash output generated from the advertised service name.

9. The method of claim 8, wherein the second request message is a Service Discovery Request frame and the second response message is a Service Discovery Response frame.

10. The method of claim 1, wherein the first request message is a Public Action frame carrying a Pre-Association Discovery Request element and the first response message is a Public Action frame carrying a Pre-Association Discovery Response element.

11. The method of claim 1, wherein the first request message is a Public Action frame carrying an attribute indicating a Subscribe function and the first response message is a Public Action frame carrying an attribute indicating a Publish function.

12. A method for operating an advertiser device, the method comprising:
   generating, by the advertiser device, a first advertiser truncated hash output from an advertised service name;
   generating, by the advertiser device, a second advertiser truncated hash output from the advertised service name, wherein the first advertiser truncated hash output and the second advertiser truncated hash output are uncorrelated;
   receiving, by the advertiser device, a first request message from a seeker device, the first request message including a first seeker truncated hash output generated from a sought service name; and
   transmitting, by the advertiser device, a first response message including the second advertiser truncated hash output in response to determining that the first seeker truncated hash output matches the first advertiser truncated hash output.

13. The method of claim 12, wherein generating the first advertiser truncated hash output comprises truncating a first part of a hash output of a hashing function with the advertised service name as input, and generating the second advertiser truncated hash output comprises truncating a second part of the hash output of the hashing function with the advertised service name as input.

14. The method of claim 13, wherein the first part of the hash output and the second part of the hash output are not overlapping with each other.

15. The method of claim 12, wherein generating the first advertiser truncated hash output comprises:
   modifying the advertised service name with a first modifying function to produce a first modified advertised service name;

generating a first hash output with a hashing function and the first modified advertised service name; and
truncating the first hash output.

16. The method of claim 12, wherein generating the second advertiser truncated hash output comprises:
modifying the advertised service name with a second modifying function to produce a second modified advertised service name;
generating a second hash output with the hashing function and the second modified advertised service name; and
truncating the second hash output.

17. The method of claim 12, wherein the first request message is a Probe Request frame and the first response message is a Probe Response frame.

18. The method of claim 17, further comprising:
generating a third advertiser truncated hash output from the advertised service name;
generating a fourth advertiser truncated hash output from the advertised service name;
receiving a second request message from the seeker device, the second request message including a third seeker truncated hash output generated from the sought service name; and
transmitting a second response message including the fourth advertiser truncated hash output in response to determining that the third seeker truncated hash output matches the third advertiser truncated hash output.

19. The method of claim 18, wherein the second request message is a Service Discovery Request frame and the second response message is a Service Discovery Response frame.

20. The method of claim 12, wherein the first request message is a Public Action frame carrying a Pre-Association Discovery Request element and the first response message is a Public Action frame carrying a Pre-Association Discovery Response element.

21. The method of claim 12, wherein the first request message is a Public Action frame carrying an attribute indicating a Subscribe function and the first response message is a Public Action frame carrying an attribute indicating a Publish function.

22. A seeker device comprising:
a processor configured to generate a first seeker truncated hash output from a sought service name, to generate a second seeker truncated hash output from the sought service name, wherein the first seeker truncated hash output and the second seeker truncated hash output are uncorrelated, and to determine that an advertised service name from an advertiser device matches the sought service name in response to determining that a second advertiser truncated hash output received from the advertiser device matches the second seeker truncated hash output;
a transmitter operatively coupled to the processor, the transmitter configured to transmit a first request message including the first seeker truncated hash output; and
a receiver operatively coupled to the processor, the receiver configured to receive a first response message from the advertiser device, the first response message including the second advertiser truncated hash output generated from the advertised service name, wherein the first seeker truncated hash output matches a first advertiser truncated hash output generated from the advertised service name.

23. The seeker device of claim 22, wherein the processor is configured to truncate a first part of a hash output of a hashing function with the sought service name as input to produce the first seeker truncated hash output, and to truncate a second part of the hash output of the hashing function with the sought service name as input to produce the second seeker truncated hash output.

24. The seeker device of claim 22, wherein the processor is configured to modify the sought service name with a first modifying function to produce a first modified sought service name, to generate a first hash output with a hashing function and the first modified sought service name, and to truncate the first hash output to produce the first seeker truncated hash output.

25. The seeker device of claim 22, wherein the processor is configured to modify the sought service name with a second modifying function to produce a second modified sought service name, to generate a second hash output with the hashing function and the second modified sought service name, to truncate the second hash output to produce the second seeker truncated hash output.

26. The seeker device of claim 22, wherein the processor is configured to generate a third seeker truncated hash output from the sought service name, and to generate a fourth seeker truncated hash output from the sought service name, wherein the transmitter is configured to transmit a second request message including the third seeker truncated hash output in response to determining that the advertised service name matches the sought service name, and wherein the receiver is configured to receive a second response message from the advertiser device, the second response message including a fourth advertiser truncated hash output generated from the advertised service name, wherein the third seeker truncated hash output matches a third advertiser truncated hash output generated from the advertised service name.

27. An advertiser device comprising:
a processor configured to generate a first advertiser truncated hash output from an advertised service name, and to generate a second advertiser truncated hash output from the advertised service name, wherein the first advertiser truncated hash output and the second advertiser truncated hash output are uncorrelated;
a receiver operatively coupled to the processor, the receiver configured to receive a first request message from a seeker device, the first request message including a first seeker truncated hash output; and
a transmitter operatively coupled to the processor, the transmitter configured to transmit a first response message including the second advertiser truncated hash output in response to determining that the first seeker truncated hash output matches the first advertiser truncated hash output.

28. The advertiser device of claim 27, wherein the processor is configured to truncate a first part of a hash output of a hashing function with the advertised service name as input to produce the first advertiser truncated hash output, and to truncate a second part of the hash output of the hashing function with the advertised service name as input to produce the second advertiser truncated hash output.

29. The advertiser device of claim 27, wherein the processor is configured to modify the advertised service name with a first modifying function to produce a first modified advertised service name, to generate a first hash output with a hashing function and the first modified advertised service name, and to truncate the first hash output to produce the first advertiser truncated hash output.

30. The advertiser device of claim 27, wherein the processor is configured to modify the advertised service name with a second modifying function to produce a second modified advertised service name, to generate a second hash output with the hashing function and the second modified advertised service name, and to truncate the second hash output to produce the second advertiser truncated hash output.

31. The advertiser device of claim 27, wherein the processor is configured to generate a third advertiser truncated hash output from the advertised service name, and to generate a fourth advertiser truncated hash output from the advertised service name, wherein the receiver is configured to receive a second request message from the seeker device, the second request message including a third seeker truncated hash output, and wherein the transmitter is configured to transmit a second response message including the fourth advertiser truncated hash output in response to determining that the third seeker truncated hash output matches the third advertiser truncated hash output.

* * * * *